US011740939B2

(12) United States Patent
Nakajima

(10) Patent No.: US 11,740,939 B2
(45) Date of Patent: Aug. 29, 2023

(54) DATA LINKAGE SYSTEM AND API PLATFORM

(71) Applicant: KYOCERA Document Solutions Inc., Osaka (JP)

(72) Inventor: Koki Nakajima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 286 days.

(21) Appl. No.: 17/205,309

(22) Filed: Mar. 18, 2021

(65) Prior Publication Data

US 2021/0303353 A1 Sep. 30, 2021

(30) Foreign Application Priority Data

Mar. 25, 2020 (JP) ................................ 2020-055177

(51) Int. Cl.
*G06F 9/50* (2006.01)
*G06F 9/54* (2006.01)

(52) U.S. Cl.
CPC ............ *G06F 9/5011* (2013.01); *G06F 9/547* (2013.01); *G06F 2209/5019* (2013.01)

(58) Field of Classification Search
CPC . G06F 9/5011; G06F 9/547; G06F 2209/5019
See application file for complete search history.

(56) References Cited

U.S. PATENT DOCUMENTS

2014/0081710 A1* 3/2014 Rabie ................. G06Q 30/0206 705/7.35
2016/0171070 A1* 6/2016 Hrle .................... G06F 16/2379 707/615

FOREIGN PATENT DOCUMENTS

JP 2016-224578 12/2016

* cited by examiner

*Primary Examiner* — Emerson C Puente
*Assistant Examiner* — Jonathan R Labud
(74) *Attorney, Agent, or Firm* — LEX IP MEISTER, PLLC

(57) ABSTRACT

A data linkage system includes an API platform that provides an API for acquiring data, which is based on data stored in a data storage system for storing data collected by a data collection system and held by an information system, from the data storage system. The API platform includes servers that execute processing to acquire the data from the data storage system in response to a request for use of the API for each classification based on at least one of a predicted processing time level, which indicates duration of a predicted time for the processing to acquire the data in response to the request for the use of the API, and a predicted response data amount level, which indicates a predicted data amount responding to the request.

2 Claims, 6 Drawing Sheets

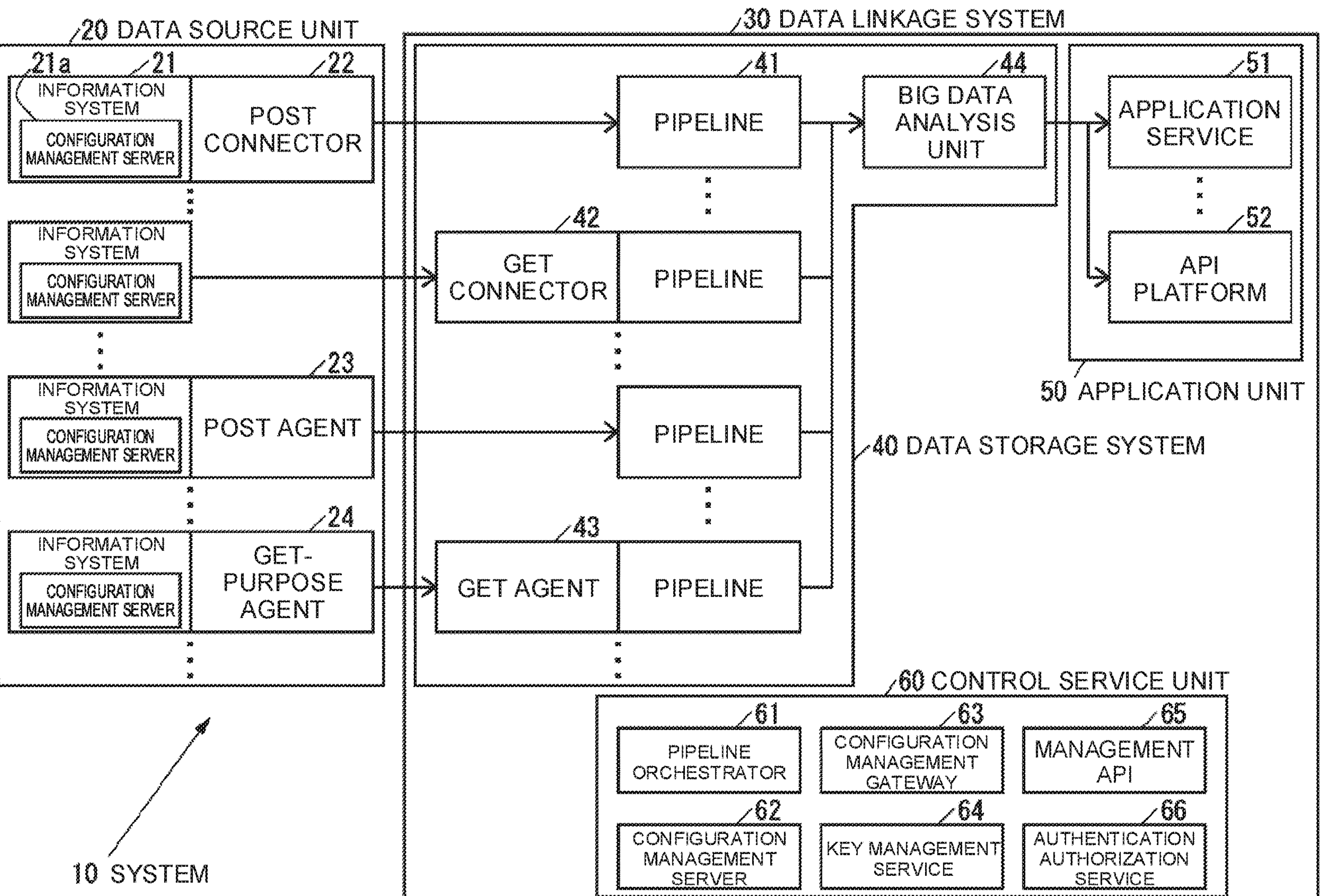
FIG. 1
20 DATA SOURCE UNIT
21a
21
INFORMATION SYSTEM
CONFIGURATION MANAGEMENT SERVER
22
POST CONNECTOR
INFORMATION SYSTEM
CONFIGURATION MANAGEMENT SERVER
23
INFORMATION SYSTEM
CONFIGURATION MANAGEMENT SERVER
POST AGENT
24
INFORMATION SYSTEM
CONFIGURATION MANAGEMENT SERVER
GET-PURPOSE AGENT
10 SYSTEM
30 DATA LINKAGE SYSTEM
41
PIPELINE
42
GET CONNECTOR
PIPELINE
PIPELINE
43
GET AGENT
PIPELINE
44
BIG DATA ANALYSIS UNIT
40 DATA STORAGE SYSTEM
51
APPLICATION SERVICE
52
API PLATFORM
50 APPLICATION UNIT
60 CONTROL SERVICE UNIT
61
PIPELINE ORCHESTRATOR
63
CONFIGURATION MANAGEMENT GATEWAY
65
MANAGEMENT API
62
CONFIGURATION MANAGEMENT SERVER
64
KEY MANAGEMENT SERVICE
66
AUTHENTICATION AUTHORIZATION SERVICE 52 API PLATFORM
70 FRONT END UNIT
71
L B
72
FRONT END PROXY
80 DATA CREATION UNIT
81 DATA CREATION UNIT INSTANCE
83
API CONTROLLER
82
API SERVER
84
QUEUE
85
BACKEND

FIG. 3

| | | PREDICTED RESPONSE DATA AMOUNT LEVEL | | |
|---|---|---|---|---|
| | | LARGE | NORMAL | SMALL |
| PREDICTED PROCESSING TIME LEVEL | SHORT | PATTERN A | PATTERN B | PATTERN C |
| | NORMAL | PATTERN D | PATTERN E | PATTERN F |
| | LONG | PATTERN G | PATTERN H | PATTERN I |

FIG. 4

| QUEUE ID | PATTERN |
|---|---|
| Q001 | PATTERN A, PATTERN D |
| Q002 | PATTERN G |
| Q003 | PATTERN H, PATTERN I |
| . | . |
| . | . |
| . | . |

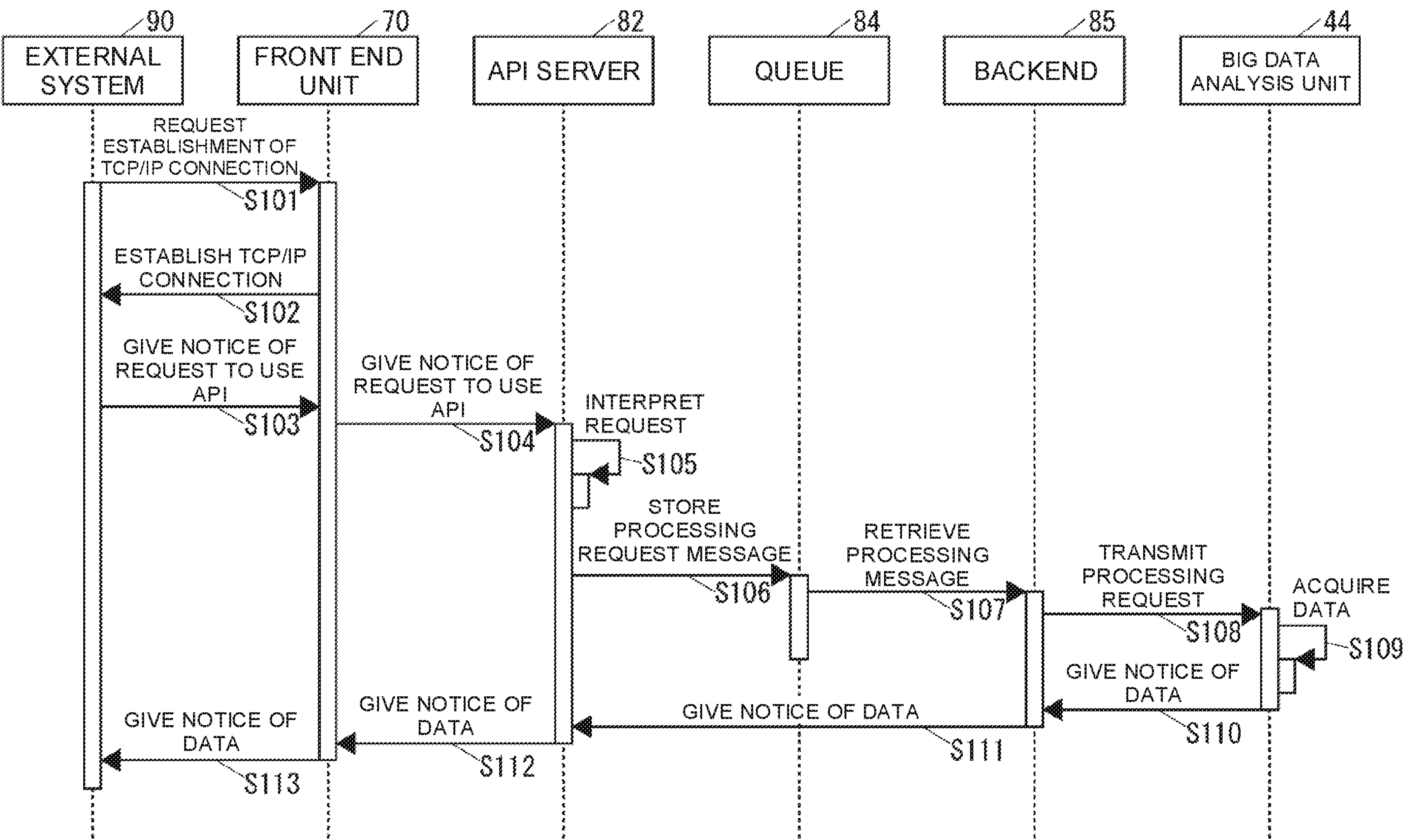
FIG. 5
90
EXTERNAL SYSTEM
70
FRONT END UNIT
82
API SERVER
84
QUEUE
85
BACKEND
44
BIG DATA ANALYSIS UNIT
REQUEST ESTABLISHMENT OF TCP/IP CONNECTION
S101
ESTABLISH TCP/IP CONNECTION
S102
GIVE NOTICE OF REQUEST TO USE API
S103
GIVE NOTICE OF REQUEST TO USE API
S104
INTERPRET REQUEST
S105
STORE PROCESSING REQUEST MESSAGE
S106
RETRIEVE PROCESSING MESSAGE
S107
TRANSMIT PROCESSING REQUEST
S108
ACQUIRE DATA
S109
GIVE NOTICE OF DATA
S110
GIVE NOTICE OF DATA
S111
GIVE NOTICE OF DATA
S112
GIVE NOTICE OF DATA
S113

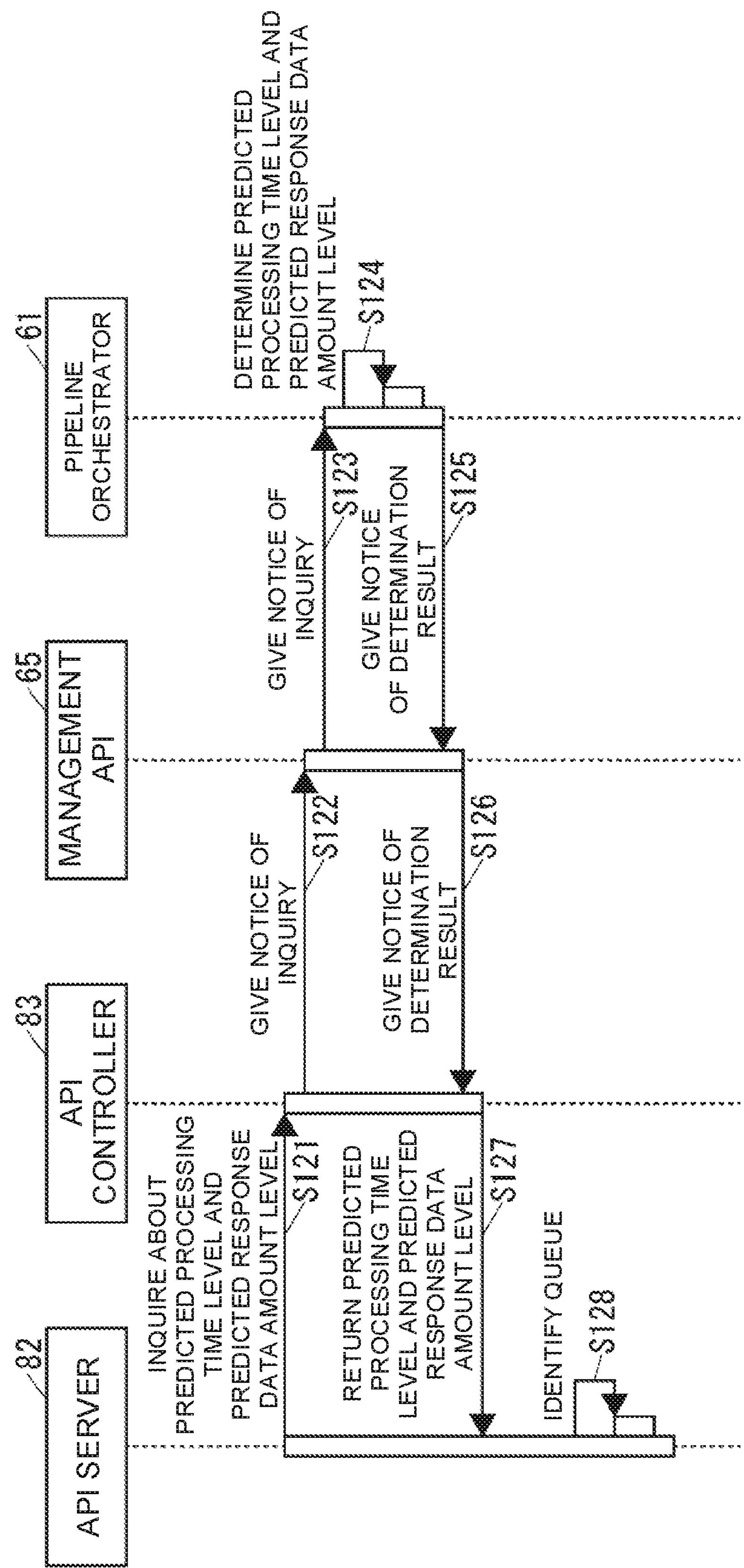
FIG. 6
API SERVER
82
API CONTROLLER
83
MANAGEMENT API
65
PIPELINE ORCHESTRATOR
61
INQUIRE ABOUT PREDICTED PROCESSING TIME LEVEL AND PREDICTED RESPONSE DATA AMOUNT LEVEL
S121
GIVE NOTICE OF INQUIRY
S122
GIVE NOTICE OF INQUIRY
S123
DETERMINE PREDICTED PROCESSING TIME LEVEL AND PREDICTED RESPONSE DATA AMOUNT LEVEL
S124
GIVE NOTICE OF DETERMINATION RESULT
S125
GIVE NOTICE OF DETERMINATION RESULT
S126
RETURN PREDICTED PROCESSING TIME LEVEL AND PREDICTED RESPONSE DATA AMOUNT LEVEL
S127
IDENTIFY QUEUE
S128

DATA LINKAGE SYSTEM AND API PLATFORM

INCORPORATION BY REFERENCE

This application is based upon, and claims the benefit of priority from, corresponding Japanese Patent Application No. 2020-055177 filed in the Japan Patent Office on Mar. 25, 2020, the entire contents of which are incorporated herein by reference.

BACKGROUND

Field of the Invention

The present disclosure relates to a data linkage system that collects and stores data held by plural information systems and to an API platform.

Description of Related Art

Typically, a system that provides an application programming interface (API) has been known, and the API acquires an execution result of a specific algorithm that corresponds to data linkage processing between software as a service (SaaS) services.

SUMMARY

A data linkage system according to the present disclosure includes: a data collection system that collects data held by an information system; a data storage system that stores the data collected by the data collection system; and an application programming interface (API) platform that provides an API for acquiring data, which is based on the data stored in the data storage system, from the data storage system. The API platform includes servers that execute processing to acquire the data from the data storage system in response to a request for use of the API, for each classification based on at least one of a predicted processing time level, which indicates duration of a predicted processing time as a predicted time for the processing to acquire the data in response to the request, and a predicted response data amount level, which indicates a predicted response data amount as a predicted amount of the data responding to the request.

An application programming interface (API) platform according to the present disclosure is an API platform that provides an API for acquiring data, which is based on data stored in a data storage system for storing data collected by a data collection system for collecting data held by an information system, from the data storage system. The API platform includes servers that execute processing to acquire the data from the data storage system in response to a request for use of the API, for each classification based on at least one of a predicted processing time level, which indicates duration of a predicted processing time as a predicted time for the processing to acquire the data in response to the request, and a predicted response data amount level, which indicates a predicted response data amount as a predicted amount of the data responding to the request.

BRIEF DESCRIPTION OF THE DRAWINGS

FIG. 1 is a block diagram a system according to a first embodiment of the present disclosure;

FIG. 3 is a table illustrating exemplary combination patterns of a predicted processing time level and a predicted response data amount level that are acquired by the API controller illustrated in FIG. 2;

FIG. 4 is a table illustrating an example of a corresponding relationship between a queue ID, which is identification information of a queue illustrated in FIG. 2, and the combination pattern of the predicted processing time level and the predicted response data amount level;

FIG. 5 is a sequence chart of schematic operation of the system illustrated in FIG. 1 when the system responds to a request for using an API from an external system;

FIG. 6 is a sequence chart of operation of the system illustrated in FIG. 1 when the system identifies the queue for storing a processing request message.

Figure 2:
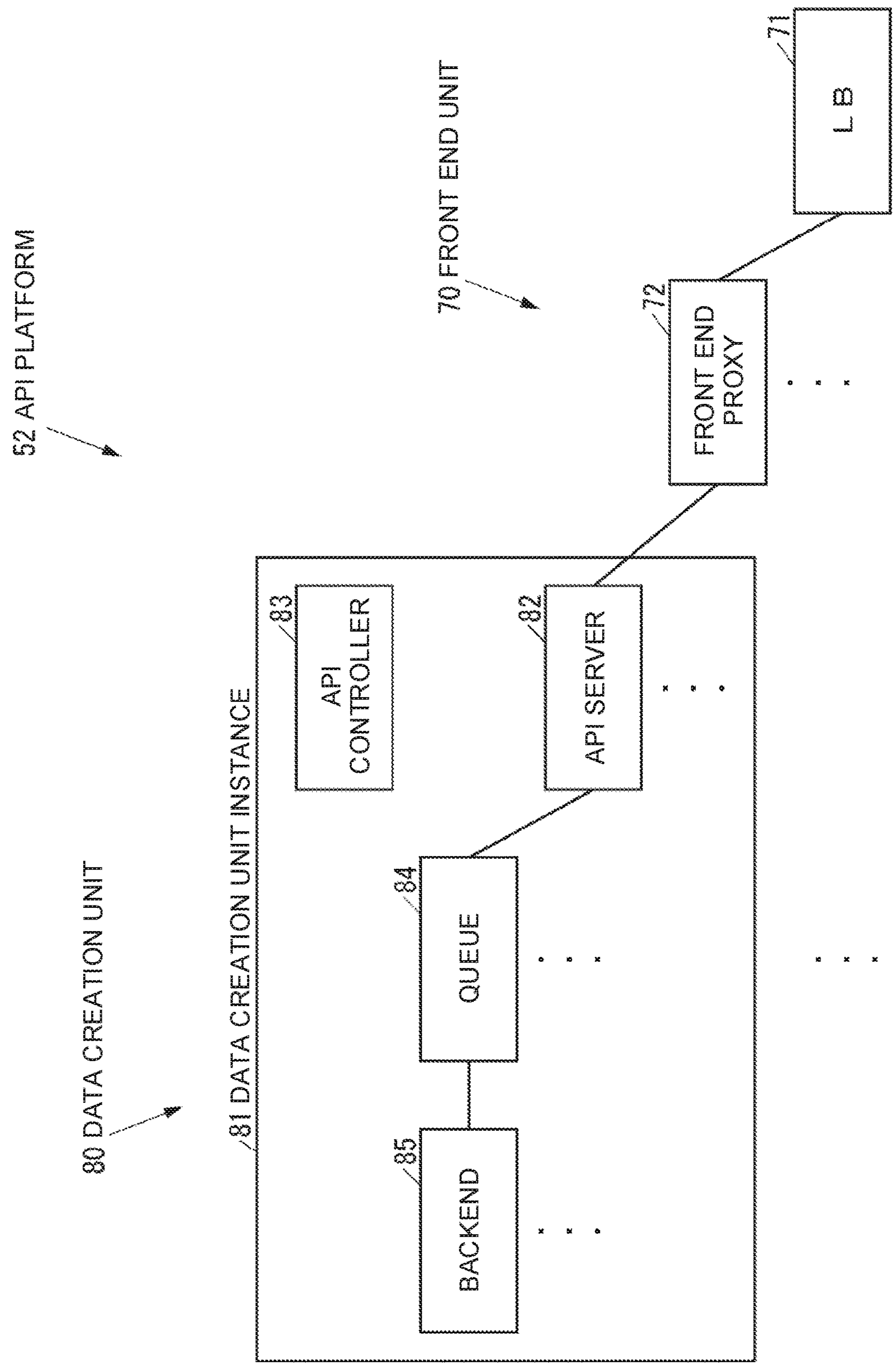
FIG. 2 is a block diagram of an API platform illustrated in FIG. 1.

A description will hereinafter be made on embodiments of the present disclosure with reference to the drawings.

First, a description will be made on a configuration of a system according to an embodiment of the present disclosure.

FIG. 1 is a block diagram of a system 10 according to the present embodiment.

As illustrated in FIG. 1, the system 10 includes: a data source unit 20 that generates data; and a data linkage system 30 that links the data generated by the data source unit 20.

The data source unit 20 includes an information system 21 that generates the data. The information system 21 includes a configuration management server 21*a* that saves a configuration and settings of the information system 21. The data source unit 20 may include at least one information system in addition to the information system 21. Examples of the information systems are: an Internet of Things (IoT) system such as a remote management system that remotely controls an image forming apparatus such as a multifunction peripheral (MFP) or a printer-dedicated machine; and an in-house system such as Enterprise Resource Planning (ERP) or a production management system. Each of the information systems may be constructed of one computer or may be constructed of plural computers. Each of the information systems may be built on public cloud. The information system may hold a structured data file. The information system may hold an unstructured data file. The information system may hold a structured data database.

The data source unit 20 includes a POST connector 22 as a data collection system that acquires the structured data file or the unstructured data file held by the information system and transmits the acquired file to a pipeline, which will be described below, in the data linkage system 30. The data source unit 20 may include, in addition to the POST connector 22, at least one POST connector that has the same configuration as the POST connector 22. The POST connector may be constructed of a computer that constitutes the information system in which the POST connector itself acquires the file. The POST connector is also a component of the data linkage system 30.

The data source unit 20 includes a POST agent 23 as the data collection system that acquires the structured data from the structured data database held by the information system and transmits the acquired structured data to the pipeline, which will be described below, in the data linkage system 30. The data source unit 20 may include, in addition to the POST agent 23, at least one POST agent that has the same configuration as the POST agent 23. The POST agent may be constructed of a computer that constitutes the information system in which the POST agent itself acquires the structured data. The POST agent is also a component of the data linkage system 30.

The data source unit 20 includes a GET-purpose agent 24 as the data collection system that generates linkage structured data on the basis of the data held by the information system. The data source unit 20 may include, in addition to the GET-purpose agent 24, at least one GET-purpose agent that has the same configuration as the GET-purpose agent 24. The GET-purpose agent may be constructed of a computer that constitutes the information system that holds the data as a source for generating the linkage structured data. The GET-purpose agent is also a component of the data linkage system 30.

The data linkage system 30 includes: a data storage system 40 that stores the data generated by the data source unit 20; an application unit 50 that uses the data stored in the data storage system 40; and a control service unit 60 that executes various types of control for the data storage system 40 and the application unit 50.

The data storage system 40 includes a pipeline 41 that stores the data generated by the data source unit 20. The data storage system 40 may include, in addition to the pipeline 41, at least one pipeline. A data configuration in the information system possibly differs by the information system. Thus, the data storage system 40 basically includes the pipeline for each of the information systems. Each of the pipelines may be constructed of one computer or may be constructed of plural computers.

The data storage system 40 includes a GET connector 42 as a data collection system that acquires the structured data file or the unstructured data file held by the information system and links the acquired file to the pipeline. The data storage system 40 may include, in addition to the GET connector 42, at least one GET connector that has the same configuration as the GET connector 42. The GET connector may be constructed of a computer that constitutes the pipeline in which the GET connector itself links the file.

The system 10 includes the POST connector in the data source unit 20 for the information system that does not acquire the structured data file or the unstructured data file from the data storage system 40. Meanwhile, the system 10 includes the GET connector in the data storage system 40 for the information system that acquires the structured data file or the unstructured data file from the data storage system 40.

The data storage system 40 includes a GET agent 43 as the data collection system that acquires the structured data generated by the GET-purpose agent and links the acquired structured data to the pipeline. The data storage system 40 may include, in addition to the GET agent 43, at least one GET agent that has the same configuration as the GET agent 43. The GET agent may be constructed of a computer that constitutes the pipeline to which the GET agent itself links the structured data.

The system 10 includes the POST agent in the data source unit 20 for the information system that does not acquire the structured data from the data storage system 40. Meanwhile, the system 10 includes the GET-purpose agent in the data source unit 20 and includes the GET agent in the data storage system 40 for the information system that acquires the structured data from the data storage system 40.

The data storage system 40 includes a big data analysis unit 44 as a data conversion system, and the big data analysis unit 44 executes final conversion processing as data conversion processing for converting the data, which is stored by the plural pipelines, into a form that can be searched and aggregated by a query language such as a database language including a SQL, for example. The big data analysis unit 44 can also search or aggregate the data that has been subjected to the final conversion processing in response to a search request or an aggregation request from the application unit 50 side. The big data analysis unit 44 may be constructed of one computer or may be constructed of plural computers.

The final conversion processing may include, as the data conversion processing, data integration processing for integrating the data in the plural information systems. In the case where the system 10 includes, as the information systems, the remote management system located in Asia to remotely manage a large number of the image forming apparatuses located in Asia, the remote management system located in Europe to remotely manage a large number of the image forming apparatuses located in Europe, and the remote management system located in America to remotely manage a large number of the image forming apparatuses located in America, each of these three remote management systems includes a device management table for management of the image forming apparatuses that are managed by the remote management system itself. The device management table is information indicating various types of information on the image forming apparatus in association with an ID assigned to each of the image forming apparatuses. Here, since each of the three remote management systems includes its own device management table, there is a possibility that the same ID is assigned to the different image forming apparatuses in the device management tables of the three remote management systems. For this reason, the big data analysis unit 44 reassigns the ID of each of the image forming apparatuses to prevent an overlap in the ID of the image forming apparatus when integrating the device management tables of the three remote management systems to generate the single device management table.

The application unit 50 includes an application service 51 that uses the data managed by the big data analysis unit 44 to perform specific operation, such as displaying of the data or an analysis of the data, that is instructed by a user. The application unit 50 may include, in addition to the application service 51, at least one application service. Each of the application services may be constructed of one computer or may be constructed of plural computers. Examples of the application service are a business intelligence (BI) tool and a software as a service (SaaS) server.

The application unit 50 includes an application programming interface (API) platform 52 that provides an API, and the API uses the data managed by the big data analysis unit 44 to perform specific operation. The API platform 52 may be constructed of one computer or may be constructed of plural computers. The API that is provided by the API platform 52 may be called from a system such as the BI tool or the SaaS server on the outside of the system 10, or may be called from the application service 51 in the application unit 50. The API that is provided by the API platform 52 is the API for acquiring the data that is based on the data stored in the data storage system 40 from the data storage system 40. Examples of the API provided by the API platform 52 are: the API that transmits data on a remaining amount of a consumable collected from the image forming apparatus by the remote management system to a consumable order system that is on the outside of the system 10 and orders the consumable in the case where the remaining amount of the consumable, such as a toner for the image forming apparatus, is equal to or smaller than a specific amount; the API that transmits various types of the data collected from the image forming apparatus by the remote management system to a failure prediction system that is on the outside of the system 10 and predicts failure of the image forming apparatus; the API that transmits counter information on the number of prints collected from the image forming apparatus by the remote management system to a system on the outside of the system 10; the API that transmits the data on a usage status by the user of the system 10 to the system on the outside of the system 10; and the API that accepts a search query for acquiring arbitrary data that is based on the data managed by the system 10.

Hereinafter, the system on the outside of the API platform 52 will simply be referred to as an external system. The external systems are the system on the outside of the system 10 and the application service 51 in the application unit 50.

FIG. 2 is a block diagram of the API platform 52.

As illustrated in FIG. 2, the API platform 52 includes: a front end unit 70 that accepts an API use request from the external system; and a data creation unit 80 that creates response data corresponding to the request accepted by the front end unit 70.

The front end unit 70 includes: a load balancer (LB) 71 as an end point presented to the external system; and a front end proxy 72 that establishes a connection with the external system. The front end unit 70 may include, in addition to the front end proxy 72, at least one front end proxy that has the same configuration as the front end proxy 72.

DETAILED DESCRIPTION

The LB 71 notifies any of the front end proxies of the API use request from the external system by a round robin method.

The front end proxy 72 notifies any of the API servers, which will be described below, of the API use request notified from the LB 71 by the round robin method.

The data creation unit 80 includes a data creation unit instance 81. The data creation unit 80 may include, in addition to the data creation unit instance 81, at least one data creation unit instance that has the same configuration as the data creation unit instance 81.

The data creation unit instance 81 includes an API server 82, and the API server 82 provides the API that uses the data managed by the big data analysis unit 44 (see FIG. 1) to perform the particular operation. The data creation unit instance 81 may include, in addition to the API server 82, at least one API server that has the same configuration as the API server 82.

The data creation unit instance 81 includes an API controller 83 that acquires a predicted processing time level and a predicted response data amount level from the control service unit 60 (see FIG. 1). The predicted processing time level indicates predicted duration of a time required for data acquisition processing in response to the API use request (hereinafter referred to as a "predicted processing time"). The predicted response data amount level indicates a predicted amount of the data responding to the API use request from the external system (hereinafter referred to as a "predicted response data amount").

FIG. 3 is a table illustrating exemplary combination patterns of the predicted processing time level and the predicted response data amount level that are acquired by the API controller 83.

In the example illustrated in FIG. 3, the predicted processing time levels are "NORMAL" indicating that the predicted processing time falls within a specific range, and "LONG" indicating that the predicted processing time is longer than an upper limit of the specific range, and "SHORT" indicating that the predicted processing time is shorter than a lower limit of the specific range. The predicted response data amount levels are "NORMAL" indicating that the predicted response data amount falls within a specific range, "LARGE" indicating that the predicted response data amount is larger than an upper limit of the specific range, and "SMALL" indicating that the predicted response data amount is smaller than a lower limit of the specific range. In the example illustrated in FIG. 3, the combination patterns of the predicted processing time level and the predicted response data amount level are nine patterns of PATTERN A to PATTERN I.

As illustrated in FIG. 2, the data creation unit instance 81 includes a queue 84 that stores a processing request message indicative of a processing request according to the API, the use of which is requested from the external system. The data creation unit instance 81 may include, in addition to the queue 84, at least one queue that has the same configuration as the queue 84. The queue is provided for each classification that is based on the combination pattern of the combination of the predicted processing time level and the predicted response data amount level.

FIG. 4 is a table illustrating an example of a corresponding relationship between a queue ID, which is identification information of the queue, and the combination pattern of the predicted processing time level and the predicted response data amount level.

As illustrated in FIG. 4, in the classification that is based on the combination pattern of the predicted processing time level and the predicted response data amount level, PATTERN A and PATTERN D may be classified the same, and PATTERN H and PATTERN I may be classified the same, for example. In FIG. 4, information on some of the queues is not illustrated.

As illustrated in FIG. 2, the data creation unit instance 81 includes a backend 85 as a server that transmits the processing request indicated by the processing request message stored in the queue 84 to the big data analysis unit 44 (see FIG. 1). The data creation unit instance 81 may include, in addition to the backend 85, at least one backend that has the same configuration as the backend 85. The backend is provided per queue. The plural backends may be provided for each of the queues. The processing request messages, which are stored in the queue, are sequentially retrieved from this queue by the backend that is in a state capable of processing the processing request message among the backends associated with this queue.

As illustrated in FIG. 1, the control service unit 60 includes a pipeline orchestrator 61 as a processing monitoring system that monitors the processing of the data at each stage in the data source unit 20, the data storage system 40, and the application unit 50. The pipeline orchestrator 61 may be constructed of one computer or may be constructed of plural computers.

For each of the requests for using the API from the external system to the API platform 52, the pipeline orchestrator 61 stores, as history, a required time for the data acquisition processing that responds to this request (hereinafter referred to as a "processing time") and an amount of the data responding to this request (hereinafter referred to as a "response data amount"). Then, the pipeline orchestrator 61 performs machine learning of the content of the API use request from the external system to the API platform 52 and a correlation between the processing time and the response data amount, and can thereby determine the predicted processing time level and the predicted response data amount level for the content of the API use request from the external system to the API platform 52.

The control service unit 60 includes a configuration management server 62 that saves a configuration and settings of the data storage system 40 and that automatically executes deployment as needed. The configuration management server 62 may be constructed of one computer or may be constructed of plural computers. The configuration management server 62 constitutes a configuration change system that changes a configuration of the data linkage system 30.

The control service unit 60 includes a configuration management gateway 63 that is connected to the configuration management server of the information system and collects information to detect a change in a configuration related to the database or the unstructured data in the information system, that is, information to detect a change in the data configuration in the information system. The configuration management gateway 63 may be constructed of one computer or may be constructed of plural computers.

The control service unit 60 includes a key management service 64, and the key management service 64 encrypts and stores security information such as key information and connection character strings that are required to link the systems including the information systems. The key management service 64 may be constructed of one computer or may be constructed of plural computers.

The control service unit 60 includes a management API 65 that accepts requests from the data storage system 40 and the application unit 50. The management API 65 may be constructed of one computer or may be constructed of plural computers.

The control service unit 60 includes an authentication authorization service 66 that authenticates/authorizes the application service 51 in the application unit 50. The authentication authorization service 66 may be constructed of one computer or may be constructed of plural computers. For example, the authentication authorization service 66 can check whether the application service 51 is permitted to request update of the data on the information system that is stored in the data storage system 40.

Next, a description will be made on operation of the system 10 when the system 10 responds to the API use request from the external system.

FIG. 5 is a sequence chart of schematic operation of the system 10 when the system 10 responds to the API use request from an external system 90.

As illustrated in FIG. 5, when making the specific API use request, the external system 90 requests the LB 71 of the front end unit 70 to a (Transmission Control Protocol (TCP)/Internet Protocol (IP) connection (S101). Here, the specific API use request is made by Hypertext Transfer Protocol Secure (HTTPS), for example. When receiving the request in S101, the LB 71 identifies the front end proxy, which notifies the request in S101, by the round robin method and notifies the identified front end proxy of the request in S101. In the following description, in order to simplify the description, it is assumed that the front end proxy notified of the request in S101 by the LB 71 is the front end proxy 72.

When being notified of the request in S101 from the LB 71, the front end proxy 72 establishes the TCP/IP connection with the external system 90 (S102).

When the TCP/IP connection with the system 10 is established, the external system 90 notifies the front end proxy 72 of the specific API use request via the established TCP/IP connection (S103).

The front end proxy 72 notifies any of the API servers of the API use request, which has been notified from the external system 90 via LB 71 in S103, by the round robin method (S104). In the following description, in order to simplify the description, it is assumed that the API server notified of the request in S104 from the front end proxy 72 is the API server 82.

When receiving the notification in S104, the API server 82 interprets the request notified in S104 (S105).

FIG. 6 is a sequence chart of the operation of the system 10 when the system 10 identifies the queue for storing the processing request message.

When performing the interpretation in S105, as illustrated in FIG. 6, the API server 82 inquires of the API controller 83 about the predicted processing time level and the predicted response data amount level of the request interpreted in S105 (S121).

When receiving the inquiry in S121, the API controller 83 notifies the management API 65 in the control service unit 60 of the inquiry in S121 (S122).

When receiving the notification in S122, the management API 65 notifies the pipeline orchestrator 61 of the inquiry notified in S122 (S123).

When receiving the notification in S123, the pipeline orchestrator 61 determines the predicted processing time level and the predicted response data amount level for the request as an inquiry target notified in S123, that is, the content of the request interpreted by the API server 82 in S105 (S124).

Next, the pipeline orchestrator 61 notifies the management API 65 of a result of the determination in S124, that is, the predicted processing time level and the predicted response data amount level that are determined in S124 (S125).

Next, the management API 65 notifies the API controller 83 of the determination result notified from the pipeline orchestrator 61 in S125 (S126).

Next, the API controller 83 replies to the API server 82 with the determination result notified from the management API 65 in S126, that is, the predicted processing time level and the predicted response data amount level (S127).

When receiving the reply in S127, the API server 82 identifies the queue that is associated with the pattern of the combination of the predicted processing time level and the predicted response data amount level replied in S127 (S128).

Hereinafter, in order to simplify the description, it is assumed that the queue that is identified in S128 is the queue 84.

As illustrated in FIG. 5, the API server 82 performs the interpretation in S105, and then stores the processing request message, which indicates the request interpreted in S105, in the queue 84 identified by the operation illustrated in FIG. 6 (S106). Here, as the API server that has stored, in the queue 84, the processing request message to be stored in the queue 84, the API server 82 puts identification information of the API server 82 itself in the processing request message stored in the queue 84.

The processing request message that has been stored in the queue 84 in S106 is retrieved from the queue 84 by any of the backends associated with the queue 84 (S107). Hereinafter, in order to simplify the description, it is assumed assumed that the back end that retrieves the processing request message from the queue 84 in S107 is the backend 85.

When retrieving the processing request message from the queue 84 in S107, the backend 85 transmits the processing request indicated by this processing request message to the big data analysis unit 44 (S108).

When the processing request is transmitted in S108, the big data analysis unit 44 executes processing that corresponds to the request transmitted in S108 and thereby acquires the data corresponding to this processing (S109).

Next, the big data analysis unit 44 notifies the backend 85 of the data acquired in S109 (S110).

When being notified of the data in S110, the backend 85 notifies the API server 82 of the data that has been notified in S110 (S111). The API server 82 stores the processing request message in the queue 84, from which the backend 85 retrieves the processing request message in S107. The processing request message retrieved from the queue 84 in S107 includes the identification information of the API server 82 that stores this processing request message in the queue 84.

When being notified of the data in S111, the API server 82 notifies the front end proxy 72 of this data (S112).

As a result, the front end proxy 72 responds to the external system 90 with the data, which is notified in S112, via the LB71 (S113). The front end proxy 72 terminates the TCP/IP connection, which is established in S102, after termination of the response in S113.

Next, a description will be made on operation of the system 10 when the system 10 performs the machine learning of the content of the API use request from the external system to the API platform 52 and the correlation between the processing time and the response data amount.

Figure 7:
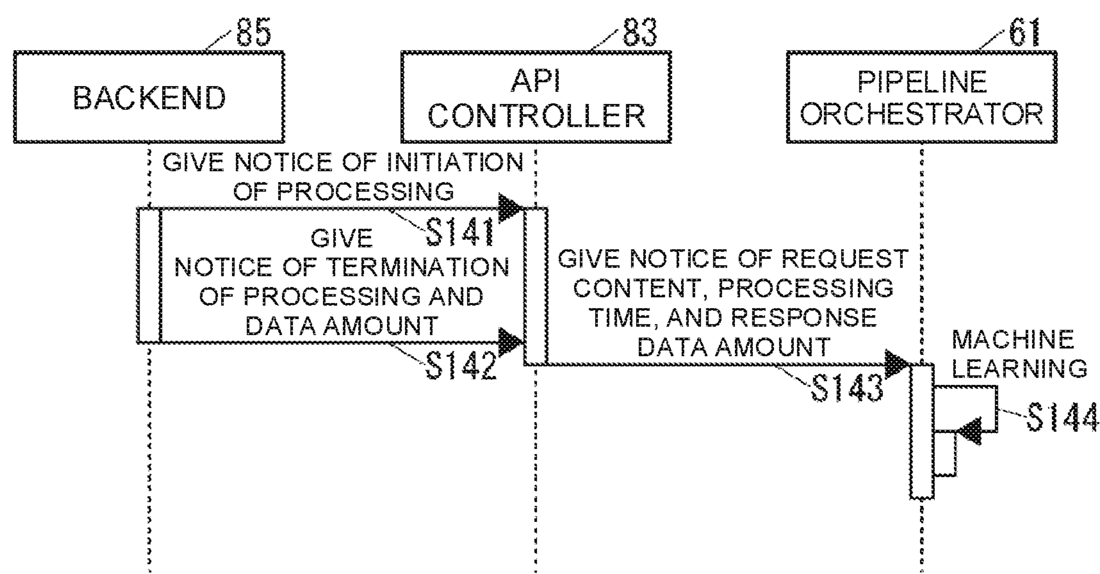
FIG. 7 is a sequence chart of operation of the system illustrated in FIG. 1 when the system performs machine learning of a correlation between a content of an API use request from the external system to the API platform and a combination of a processing time and a response data amount.

FIG. 7 is a sequence chart of the operation of the system 10 when the system 10 performs the machine learning of the content of the API use request from the external system to the API platform 52 and the correlation between the processing time and the response data amount.

When the backend 85 starts transmitting the processing request to the big data analysis unit 44 in S108, as illustrated in FIG. 7, the backend 85 notifies the API controller 83 of initiation of the data acquisition processing that responds to the API use request from the external system (S141).

Next, when the notification of the data from the big data analysis unit 44 in S110 is terminated, the backend 85 notifies the API controller 83 of the termination of the data acquisition processing that responds to the API use request from the external system and the data amount notified from the big data analysis unit 44 in S110 (S142).

When receiving the notification in S142, the API controller 83 notifies the pipeline orchestrator 61 of the content of the API use request from the external system to the API platform 52 as well as the processing time and the response data amount for this request (S143). Here, the API controller 83 calculates a period from time at which the initiation of the processing is notified in S141 to time at which the termination of the processing is notified in S142 as the processing time. In addition, the API controller 83 sets the data amount notified in S142 as the response data amount.

When receiving the notification in S143, the pipeline orchestrator 61 performs the machine learning of the content of the API use request from the external system to the API platform 52 and the correlation between the processing time and the response data amount that have been notified so far from the API controller 83 (S144). Accordingly, the pipeline orchestrator 61 can determine the predicted processing time level and the predicted response data amount level for the content of the API use request from the external system to the API platform 52.

As it has been described so far, the data linkage system 30 includes the backend, which executes the processing to acquire the data from the data storage system 40 (S108 and S110) in response to the API use request, for each classification that is based on the pattern of the combination of the predicted processing time level and the predicted response data amount level. Thus, it is possible to execute the processing to acquire the data from the data storage system 40 by the appropriate backend according to the pattern of the combination of the predicted processing time level and the predicted response data amount level of this processing. Therefore, the data linkage system 30 can behave according to the load of the processing to be executed in response to the API use request.

In the case where the API platform 52 includes: a specific processing time backend that is a backend for the classification based on the specific predicted processing time level; and a processing time length backend that is a backend for the classification based on the longer predicted processing time than the specific predicted processing time level, at least one of memory capacity and a network band of the processing time length backend may be greater than that of the specific processing time backend. A specific processing time backend as a backend for classification based on a specific prediction processing time level, and a processing time length as a backend for classification based on a prediction processing time level where the prediction processing time is longer than the specific prediction processing time level. When the API platform 52 has a backend, the processing time length backend may have at least one of the memory capacity and the network band more than the specific processing time backend. With this configuration, in the case where the predicted processing time of the processing to acquire the data from the data storage system is long, the data linkage system 30 can execute this processing by the backend, in which at least one of the memory capacity and the network is greater than that of the case where the predicted processing time of this processing is short. Therefore, the data linkage system 30 can behave according to the load of the processing to be executed in response to the API use request.

In the case where the API platform 52 includes: a specific response data amount backend that is a backend for the classification based on the specific predicted response data amount level; and a large response data amount backend that is a backend for the classification based on the predicted response data amount level in which the predicted response data amount is larger than that in the specific predicted response data amount level, at least one of the memory capacity and the network band of the large response data amount backend may be greater than that of the specific response data amount backend. With this configuration, in the case where the predicted response data amount of the processing to acquire the data from the data storage system is large, the data linkage system 30 can execute this processing by the backend, in which at least one of the memory capacity and the network is greater than that of the case where the predicted response data amount of this processing is small. Therefore, the data linkage system 30 can behave according to the load of the processing to be executed in response to the API use request.

The data linkage system 30 includes the queue and the backend for each classification that is based on the pattern of the combination of the predicted processing time level and the predicted response data amount level. However, the data linkage system 30 may include the queue and the backend for each classification that is based on one of the predicted processing time level and the predicted response data amount level.

What is claimed is:

1. A data linkage system comprising:

a data collection system that collects data held by an information system;

a data storage system that stores the data collected by the data collection system; and an application programming interface (API) platform that provides an API for acquiring data, which is based on the data stored in the data storage system, from the data storage system, wherein the API platform includes servers that execute processing to acquire the data from the data storage system in response to a request for use of the API, for a classification based on at least one of a predicted processing time level, which indicates duration of a predicted processing time as a predicted time for the processing to acquire the data in response to the request, and a predicted response data amount level, which indicates a predicted response data amount as a predicted amount of the data responding to the request, and wherein the API platform includes:

a specific processing time server as the server for the classification that is based on a specific predicted processing time level; and a processing duration server as the server for the classification that is based on the predicted processing time level, in which the predicted processing time is longer than that in the specific predicted processing time level, and at least one of capacity of memory and a network band of the processing duration server is greater than that of the specific processing time server.

2. A data linkage system comprising:

a data collection system that collects data held by an information system;

a data storage system that stores the data collected by the data collection system; and an application programming interface (API) platform that provides an API for acquiring data, which is based on the data stored in the data storage system, from the data storage system, wherein the API platform includes servers that execute processing to acquire the data from the data storage system in response to a request for use of the API, for a classification based on at least one of a predicted processing time level, which indicates duration of a predicted processing time as a predicted time for the processing to acquire the data in response to the request, and a predicted response data amount level, which indicates a predicted response data amount as a predicted amount of the data responding to the request, and wherein the API platform includes:

a specific response data amount server as the server for the classification that is based on a specific predicted response data amount level; and a large response data amount server as the server for the classification that is based on the predicted response data amount level, in which the predicted response data amount is larger than that in the specific predicted response data amount level, and at least one of capacity of memory and a network band of the large response data amount server is greater than that of the specific response data amount server.

* * * * *